(12) United States Patent
Chang et al.

(10) Patent No.: US 12,280,334 B2
(45) Date of Patent: Apr. 22, 2025

(54) WATER PURIFIER

(71) Applicant: COWAY Co., Ltd., Gongju-si (KR)

(72) Inventors: Min-Suk Chang, Seoul (KR); Yong-Yeon Noh, Seoul (KR); Woo-Jin Joo, Seoul (KR); Myeong-Hoon Kang, Seoul (KR); Ki-Hong Min, Seoul (KR); Jin-Woo Choi, Seoul (KR); Young-Jae Lee, Seoul (KR); Dong-Hui Kim, Seoul (KR); Sang-Jin Youn, Seoul (KR); Gyeong-Jong Kim, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 392 days.

(21) Appl. No.: 17/999,365

(22) PCT Filed: May 18, 2021

(86) PCT No.: PCT/KR2021/006203
§ 371 (c)(1),
(2) Date: Nov. 18, 2022

(87) PCT Pub. No.: WO2021/235822
PCT Pub. Date: Nov. 25, 2021

(65) Prior Publication Data
US 2023/0191329 A1   Jun. 22, 2023

(30) Foreign Application Priority Data
May 19, 2020   (KR) .................. 10-2020-0059952

(51) Int. Cl.
*B01D 61/02* (2006.01)
*B01D 61/08* (2006.01)
(Continued)

(52) U.S. Cl.
CPC ......... *B01D 61/025* (2013.01); *B01D 61/081* (2022.08); *B01D 61/10* (2013.01);
(Continued)

(58) Field of Classification Search
CPC .... B01D 61/025; B01D 61/081; B01D 61/10; B01D 61/12; B01D 2313/18;
(Continued)

(56) References Cited

U.S. PATENT DOCUMENTS 10,266,441 B2   4/2019   Lee et al.
10,723,642 B2   7/2020   Moon et al.
(Continued)

FOREIGN PATENT DOCUMENTS

CN   108464734 A   8/2018
CN   208075342 U   11/2018
(Continued)

OTHER PUBLICATIONS

International Search Report mailed on Aug. 20, 2021 in PCT/KR2021/006203 filed on May 18, 2021 (citing references 1-4 & 15-19 therein, 3 pages).
(Continued)

*Primary Examiner* — Terry K Cecil
(74) *Attorney, Agent, or Firm* — Oblon, McClelland, Maier & Neustadt, L.L.P.

(57) ABSTRACT

Provided is a water purifier comprising: a filter unit which has a reverse osmosis membrane filter; a supply valve; an instantaneous heating device which is provided with an inflow port, and an outflow port, and which heats and purifies water entering through the inflow port and flowing to the outflow port, so that hot water is discharged through the outflow port; an extraction member; a supply pump; a domestic water drain line; a hot water drain line; a hot water drain valve; and a control unit which controls the opening/closing of respective flow channels of the hot water drain line and the domestic water drain line so that, among a hot water draining process through the hot water drain line, and a domestic water draining process through the domestic (Continued)

water drain line, the hot water draining process is carried out first.

10 Claims, 11 Drawing Sheets

(51) Int. Cl.
*B01D 61/10* (2006.01)
*B01D 61/12* (2006.01)
*C02F 1/00* (2023.01)
*C02F 1/02* (2023.01)
*C02F 1/44* (2023.01)

(52) U.S. Cl.
CPC .............. *B01D 61/12* (2013.01); *C02F 1/008* (2013.01); *C02F 1/02* (2013.01); *C02F 1/441* (2013.01); *B01D 2313/18* (2013.01); *B01D 2313/243* (2013.01); *C02F 2201/005* (2013.01); *F25C 2400/14* (2013.01)

(58) Field of Classification Search
CPC .......... B01D 2313/243; B01D 2311/06; B01D 2311/103; B01D 2311/1032; C02F 1/008; C02F 1/02; C02F 1/441; C02F 2201/005; C02F 2209/005; C02F 1/001; C02F 2209/02; C02F 2209/03; C02F 2209/40; C02F 2303/16; C02F 2307/10; F25C 2400/14; F25C 1/25; F25C 5/18; B67D 1/00; B67D 1/08; B67D 1/12; B67D 1/0895; B67D 1/1202; B67D 2001/0093; B67D 2001/0097; B67D 2210/0001
See application file for complete search history.

(56) References Cited

U.S. PATENT DOCUMENTS

| 2013/0062219 A1 | 3/2013 | Lee et al. |
| 2018/0370831 A1 | 12/2018 | Moon et al. |

FOREIGN PATENT DOCUMENTS

| CN | 209161630 U | 7/2019 | |
| CN | 110642397 A | 1/2020 | |
| KR | 20120131720 A | * 12/2012 | .............. C02F 1/001 |
| KR | 20120132347 A | * 12/2012 | ............ C02F 1/4691 |
| KR | 10-2014-0022938 A | 2/2014 | |
| KR | 10-2014-0121234 A | 10/2014 | |
| KR | 10-2017-0067579 A | 6/2017 | |
| KR | 10-2018-0008847 A | 1/2018 | |

OTHER PUBLICATIONS

Chinese Ofice Action issued in Chinese Patent Application No. 202180036582.7 on Feb. 27, 2025.

* cited by examiner

WATER PURIFIER

TECHNICAL FIELD

The present invention relates to a water purifier having an instantaneous heating device, and more particularly, to a water purifier generating purified water through a reverse osmosis membrane filter and generating hot water through an instantaneous heating device.

BACKGROUND ART

A water purifier is a device for generating purified water by filtering raw water through a filter unit having a plurality of filters, and provides not only purified water at room temperature but also hot water and/or cold water to a user. In addition, recently, an ice-making water purifier having an ice-making function as well as a water purifying function is used.

Such a water purifier can implement required filtration performance through various filters provided in the filter unit.

As an example, a reverse osmosis membrane filter (RO filter) having a high degree of filtration may be installed in the filter unit. This reverse osmosis membrane filter filters raw water by reverse osmosis, and domestic water (concentrated water, wastewater) that does not pass through the reverse osmosis membrane is drained externally through a drainage line.

Meanwhile, water purifiers sometimes use a hot water tank storing purified water in a heated state for extracting hot water, but recently, when a user inputs a hot water extraction signal, an instantaneous heating device (rapid heating device) providing hot water to a user by performing heating in a process in which purified water flowing into a water inlet is discharged to a water outlet, has been widely used.

When a hot water extraction signal is input, this instantaneous heating device performs heating through a heater, and when the instantaneous heating device is operated after the hot water extraction signal is input, since a temperature of water, initially discharged from the instantaneous heating device is low, the initially discharged water (drain water, waste water) is drained according to a predetermined flow rate or time). In addition, even when hot water extraction is terminated, high-temperature water (drain water, waste water) remaining in the instantaneous heating device is drained.

Meanwhile, when a reverse osmosis membrane filter and an instantaneous heating device are provided at the same time, domestic water not having passed through the reverse osmosis membrane filter is drained through the domestic water drainage line, and drain water (waste water) drained from the instantaneous heating device is drained through a hot water drainage line. In this case, for the convenience of connecting various drainage lines to a final drainage location (a sewer, or the like) and reducing the number and installation costs of drainage lines, various drainage lines (for example, a domestic water drainage line and a hot water drainage line) are connected to a single drainage line.

Although an installation standard of such a drainage line depends on the design specification of the water purifier, it has a fairly long length (e.g., 25 m) and high installation height (e.g., 3 m).

Moreover, the drainage line is often installed in a twisted or bent state not only inside the water purifier but also outside the water purifier. Defects (drain failures) may occur frequently. In this case, due to an increase in flow resistance due to the long length of the drainage line and pressure loss due to a difference in height, poor drainage (drain failure) frequently occurs.

In particular, since the amount of drain water (wastewater) to be drained increases when domestic water drainage and hot water drainage are performed simultaneously, drainage of only the drainage line with high pressure is performed among the domestic water drainage line and the hot water drainage line, and drainage of the drainage line with low pressure is not performed, resulting in poor drainage. For example, when the hot water drainage additionally performed while the domestic water drainage is being performed, there is a problem that the hot water drainage is not performed if discharge pressure of the hot water drainage is lower than discharge pressure of the domestic water drainage, and conversely, the domestic water drainage is not performed if the discharge pressure of the hot water drainage is higher than the discharge pressure of the domestic water drainage. For reference, the domestic water discharge pressure is determined by a length of an entire drainage line from the reverse osmosis membrane filter to the final discharge position (end of the drainage line), flow resistance in the drainage line, a heigt difference, and the like.

As described above, when a hot water extraction signal is input and the instantaneous heating device operated, water drained from the instantaneous heating device is drained according to a predetermined condition (for example, a predetermined flow rate). When the hot drain is not performed (for example, when the discharge pressure of the hot water drainage is lower than the discharge pressure of the domestic water drainage under the condition that the domestic water drainage and the hot water drainage are performed at the same time), since a flow rate of water flowing into the instantaneous heating device does not reach the predetermined flow rate, heating of the water accommodated in the instantaneous heating device continuously performed without hot water extraction, resulting in an overheated state. In order to prepare for such an overheated state, the instantaneous heating device is equipped with a safety valve for discharging steam when a predetermined pressure is reached. However, when the safety valve is damaged or malfunctions, a serious accident may occur in which the instantaneous heating device explodes due to a non-operation of the safety valve, and there is problem in that hot water is not extracted even when the safety valve operates normally.

Conversely, there is a problem in that the filtration performance through the reverse osmosis membrane filter is deteriorated if the domestic water is not drained.

Meanwhile, drain water (waste water) generated from the internal components of the water purifier (for example, ice storage, instantaneous heating device, or the like) is temporarily accommodated in the drainage tank, and a water level of the drainage tank reaches a certain water level (e.g., full water level), the drain water contained in the drainage tank is drained through a drainage line.

As described above, when the hot water drainage from the instantaneous heating device and the drain of the domestic water by the reverse osmosis membrane filter as well as the drain of drain water accommodated in the drainage tank are performed in a complex manner, a problem that occurs because the drain water from the instantaneous heating device is not drained may occur more frequently. In addition, if drainage of the drain water accommodated in the drainage tank is not performed, a supply of drain water to the drainage tank continues and overflow of water may occur, which may cause safety accidents such as electric shock or fire.

SUMMARY OF INVENTION

Technical Problem

The present disclosure has been devised to solve at least some of the problems of the prior art as described above, and an aspect of the present invention is to provide a water purifier capable of stably and smoothly draining various types of drain water such as domestic water.

Another aspect of the present invention is to provide a water purifier capable of preventing explosion of instantaneous heating device or non-extraction of hot water, which may occur due to poor drainage of drain water drained from instantaneous heating device.

Another aspect of the present invention is to provide a water purifier capable of preventing safety accidents such as electric shocks or fire due to overflow of water in the drainage tank that may occur due to poor drainage of the drain water drained from the drainage tank.

Solution to Problem

According to an aspect of the present disclosure, a water purifier is provided, the water purifier including: a filter unit having a reverse osmosis membrane filter in order to generate purified water; a supply valve opened and closed so that water is supplied to the reverse osmosis membrane filter; an instantaneous heating device having a water inlet supplied with purified water, having been filtered by the filter unit, and a water outlet having the purified water heated and discharged therefrom, and heating the purified water flowing into the water inlet and flowing out to the water outlet, so that hot water is discharged through the water outlet; an extraction member provided for extracting the hot water discharged from the instantaneous heating device; a supply pump operating in order to supply purified water to the water inlet of the instantaneous heating device; a domestic water drainage line from which domestic water, having not been filtered by the reverse osmosis membrane filter is discharged; a hot water drainage line from which drain water, having been drained from the instantaneous heating device is drained; a hot water drainage valve provided in the hot water drainage line so as to open and close the hot water drainage line; and a control unit controlling the opening and closing of respective flow passages of the hot water drainage line and the domestic water drainage line so that, among a hot water drainage process through the hot water drainage line, and a domestic water drainage process through the domestic water drainage line, the hot water drainage process is carried out first.

When a hot water drainage signal for draining the number of drain water drained from the instantaneous heating device through the hot water drainage line is input, the control unit may be configured to open the hot water drainage valve and close the supply valve so that the hot water drainage process is performed.

In addition, when the hot water drainage signal is input in a state in which the supply valve is opened, the control unit may be configured to open the hot water drainage valve and close the supply valve so that the hot water drainage process is performed, after the hot water drainage process is terminated, the control unit may be configured to reopen the supply valve so that the domestic water drainage process is performed, and when the hot water drainage signal is input in a state in which the supply valve is closed, the control unit may be configured to open the hot water drainage valve to perform the hot water drainage process and maintain the closed state of the supply valve.

When the hot water drainage signal is input, the control unit may b configured to drive the supply pump and supply purified water to the water inlet.

In this case, the hot water drainage signal may include at least one of an initial drainage signal for draining purified water, initially supplied to the instantaneous heating device through the hot water drainage line according to a predetermined first drain condition as a hot water extraction signal is input, and a terminal drainage signal for draining hot water remaining in the instantaneous heating device through the hot water drainage line according to a predetermined second drain condition as a hot water extraction termination signal is input.

According to an aspect of the present disclosure, a water purifier may further include: a drainage tank for storing drain water generated inside the water purifier; a drainage tank drainage line through which the drain water accommodated in the drainage tank is drained; and a drainage pump provided in the drainage tank drainage line and operating to drain the drain water accommodated in the drainage tank, wherein the control unit may be configured to control opening and closing of flow passages of the hot water drainage line, the domestic water drainage line, and the drainage tank drainage line, so that a drain operation is preferentially performed in an order of the hot water drainage process, the drainage tank drainage process, and the domestic water drainage process, among the hot water drain process, the domestic water drainage process, and a drainage tank drainage process through the drainage tank drainage line.

When a hot water drainage signal for draining drain water drained from the instantaneous heating device through the hot water drainage line is input, the control unit may be configured to open the hot water drainage valve to prevent the drainage pump from operating, and close the supply valve to perform the hot water drainage process, and when a drainage tank drainage signal for draining the drain water the drain water accommodated in the drainage tank through the drainage tank drainage line is input, if the hot water drain water is being performed, after the hot water drainage process is terminated, the control unit may be configured to drive the drainage pump so that the drainage tank drainage process is performed, and when the hot water drainage process is not being performed, the control unit may be configured to drive the drainage pump and close a supply valve so that the drainage tank drainage process is performed.

When the hot water drainage signal is input in a state in which the supply valve is opened, the control unit may be configured to open the hot water drainage valve and close the supply valve so that the hot water drainage process is performed, and to reopen the supply valve, after the drainage tank drainage process is terminated, so that the domestic water drainage process is performed, and when the hot water drainage signal is input in a state in which the supply valve is closed, the control unit may be configured to open the hot water drainage valve so that the hot water drainage process is performed and a closed state of the supply valve is maintained, and when the drainage tank drainage signal in a state in which the supply valve is closed, the control unit C may be configured to drive the drainage pump and maintain the closed state of the supply valve so that the drainage tank drainage process is performed.

Meanwhile, the drainage tank may store drain water, initially drained from the instantaneous heating device after a hot water extraction signal is input.

In addition, the water purifier according to an aspect of the present disclosure may include: an ice-making unit for generating ice through purified water filtered by the filter unit; and an ice storage for storing the ice generated by the ice-making unit, wherein the drainage tank may store drain water drained from the ice storage.

Advantageous Effects of Invention

As set forth above, according to an embodiment of the present invention having such a configuration, it is possible to obtain an effect that a drain can be stably and smoothly performed by sequentially performing by allowing drainage of various drain water to be sequentially performed in a predetermined order rather than being performed simultaneously.

According to an embodiment of the present invention, by controlling drainage of drain water drained from an instantaneous heating device to have the highest priority, it is possible to obtain an effect to prevent explosion of the instantaneous heating device or non-extraction of hot water, which may occur due to poor drainage of the drain water drained from the instantaneous heating device.

According to an embodiment of the present invention, by controlling drainage of drain water drained from a drainage tank to be prioritized over drainage of domestic water, it is possible to obtain an effect of preventing safety accidents such as water overflow in the drainage tank and electric shock or fire that may occur due to poor drainage of the drain water drained from the drainage tank.

MODE FOR INVENTION

Figure 1:
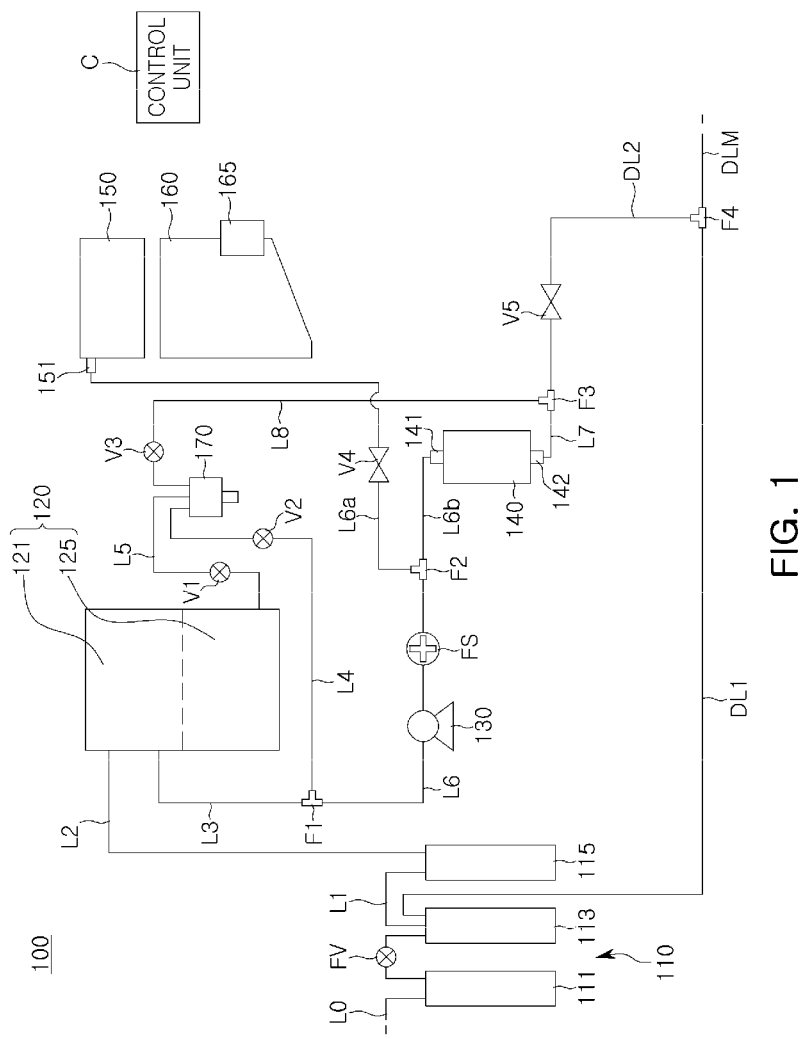
FIG. 1 is a schematic water pipe diagram of a water purifier according to a first embodiment of the present invention.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity. In addition, the same reference numerals will be used throughout the drawings for elements having the same or similar functions and operations. Hereinafter, embodiments of the present disclosure will be described with reference to the drawings.

In addition, in the present specification, the singular expression includes a plural expression unless the context clearly dictates otherwise, and the same reference signs refer to the same element or corresponding element throughout the specification.

Hereinafter, embodiments of the present invention will be described with reference to the drawings.

First, a water purifier 100 according to a first embodiment of the present disclosure will be described with reference to FIGS. 1 to 5.

Figure 2:
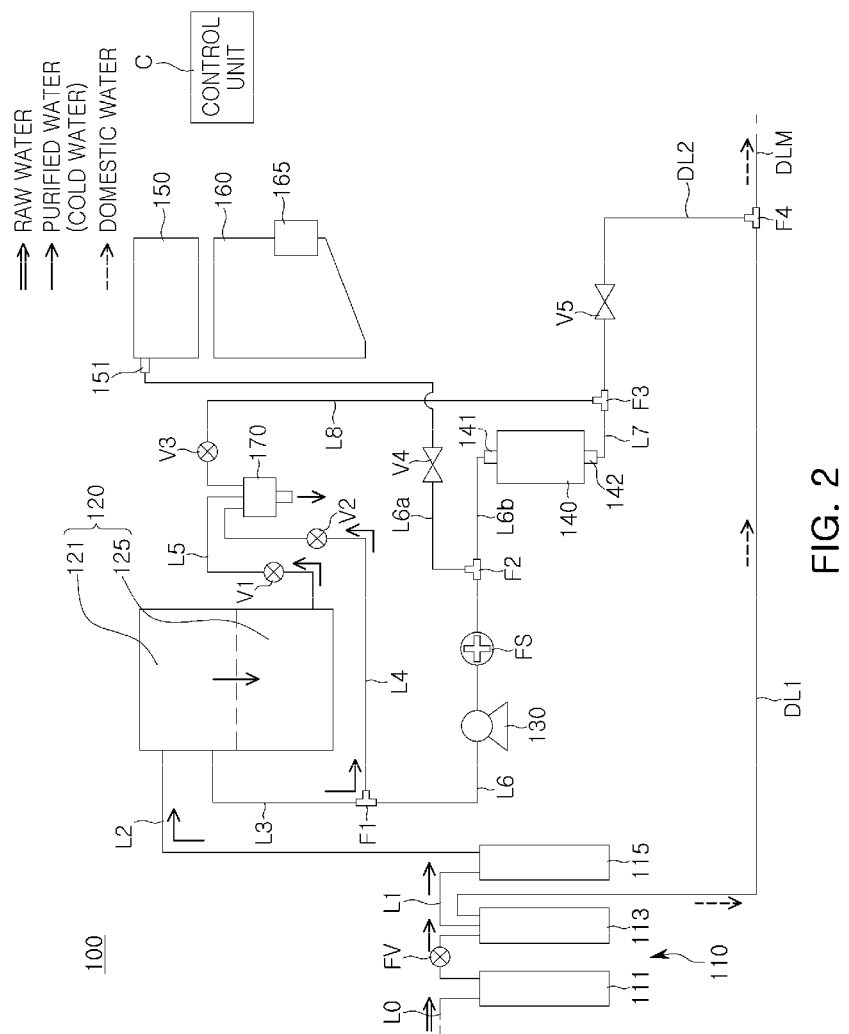
FIG. 2 is a water pipe diagram illustrating a flow of water when filtration of raw water and extraction of purified/cold water are performed in the water purifier illustrated in FIG. 1.
Figure 3:
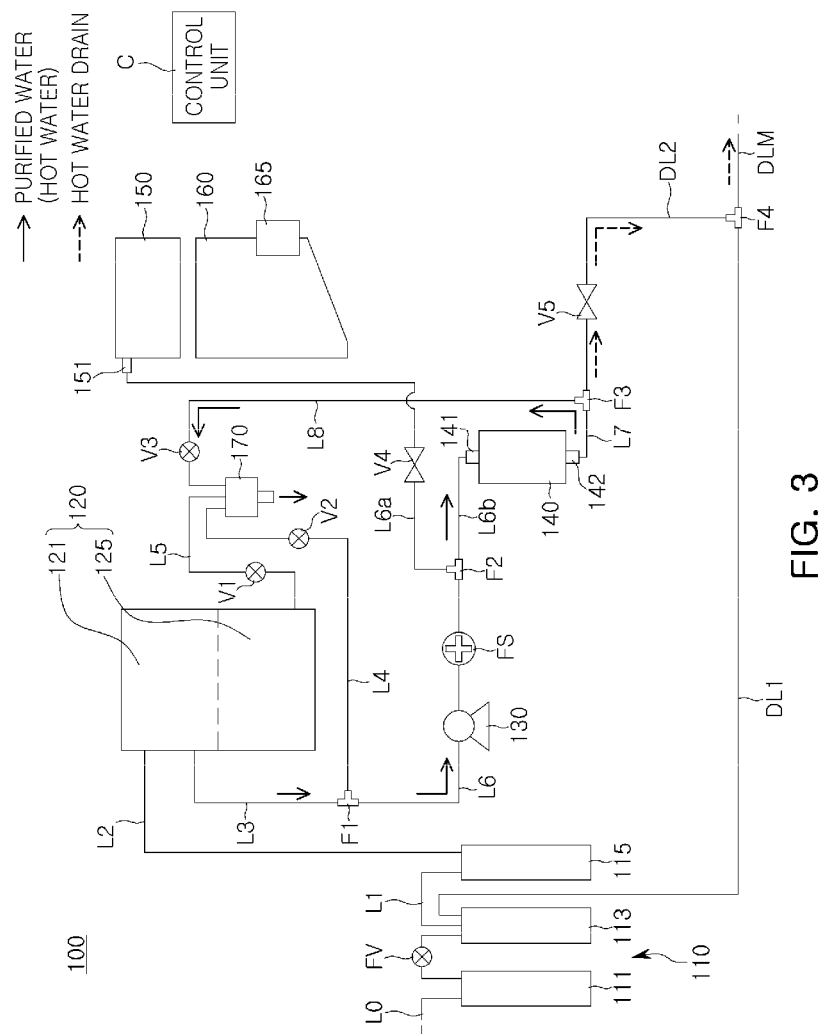
FIG. 3 is a water pipe diagram illustrating a flow of water when extraction of hot water is performed from the water purifier illustrated in FIG. 1.
Figure 4:
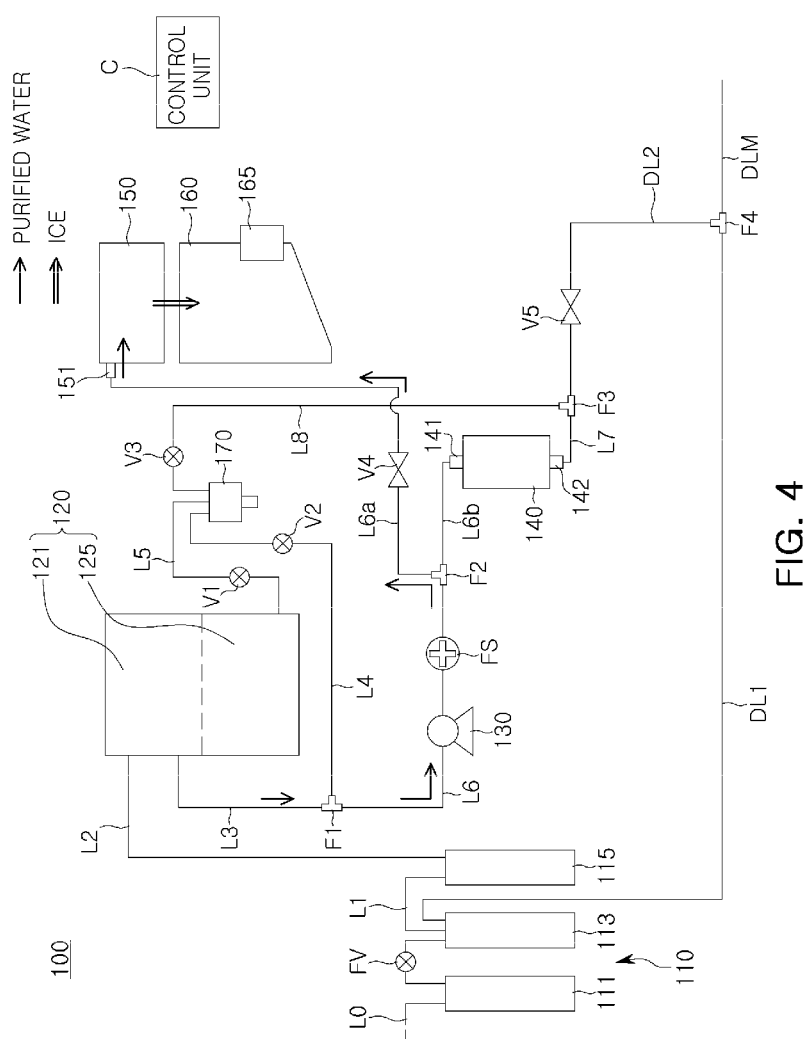
FIG. 4 is a water pipe diagram illustrating a flow of water when ice is made in the water purifier illustrated in FIG. 1.
Figure 5:
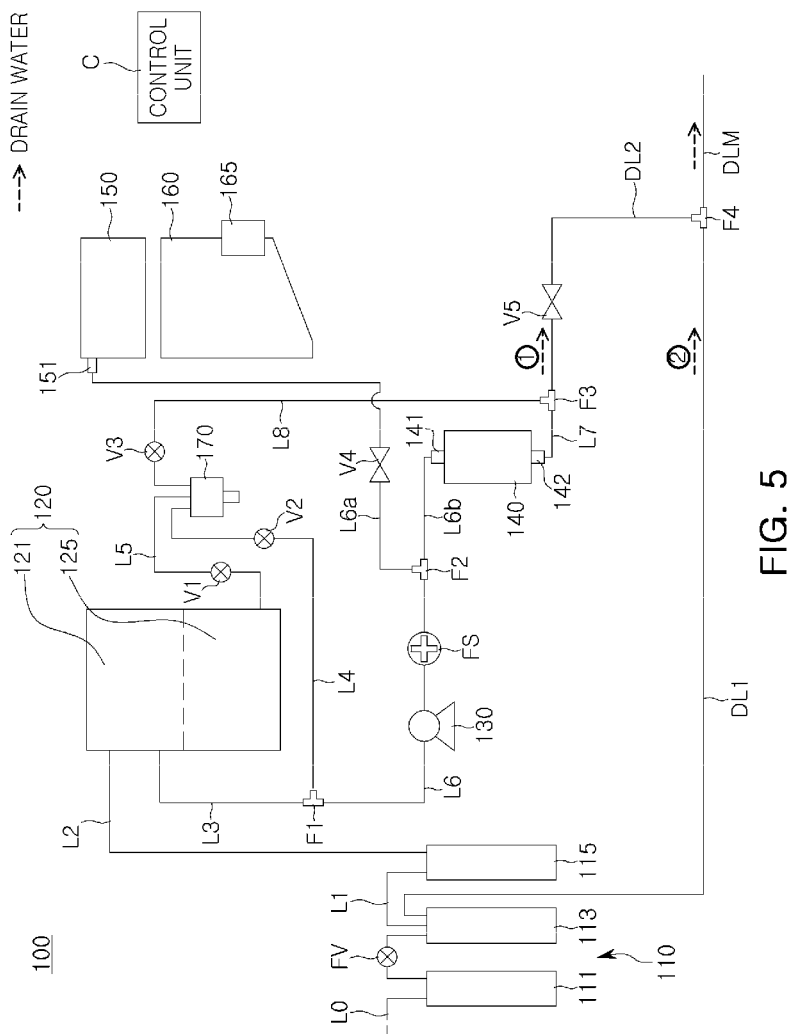
FIG. 5 is a water pipe diagram illustrating priority of a domestic water drainage process and a hot water drainage process in the water purifier illustrated in FIG. 1.

FIG. 1 is a schematic water pipe diagram of a water purifier 100 according to a first embodiment of the present invention, FIG. 2 is a water pipe diagram illustrating a flow of water when filtration of raw water and extraction of purified/cold water are performed in the water purifier 100 illustrated in FIG. 1, FIG. 3 is a water pipe diagram illustrating a flow of water when extraction of hot water is performed from the water purifier 100 illustrated in FIG. 1, FIG. 4 is a water pipe diagram illustrating a flow of water when ice is made in the water purifier 100 illustrated in FIG. 1, and FIG. 5 is a water pipe diagram illustrating priority of a domestic water drainage process (②) in FIG. 5) and a hot water drainage process (①) in FIG. 5) in the water purifier 100 illustrated in FIG. 1.

Referring to FIG. 1, the water purifier 100 according to a first embodiment of the present invention may be configured to include a filter unit 110, a supply pump 130, an instantaneous heating device 140, an extraction member 170, various valves (FV, V1, V2, V3, V4, and V5), a flow passage, and a control unit C, and additionally include a water tank unit 120, an ice-making unit 150, an ice storage unit 160, a flow rate sensor FS, and the like.

The filter unit 110 is configured to filter raw water supplied through a raw water supply passage L0 to generate purified water, and include a reverse osmosis membrane filter 113. The filter unit 110 may be configured to include a plurality of filters like the conventional water purifier 100, and as an example, include a pre-filter 111, a reverse osmosis membrane filter 113, and a post-filter 115. The pre-filter 111 may be formed of a composite filter of a sediment filter and a pre-carbon filter, and the post-filter 115 may be formed of a post-carbon filter or the like. However, the filter provided in the filter unit 110 according to the present invention can be variously changed through a known filter except for the reverse osmosis membrane filter 113.

A supply valve FV that opens and closes to supply water to the reverse osmosis membrane filter 113 is provided at a front end of the reverse osmosis membrane filter.

The filter unit 110 is provided with a filter unit flow passage L1 connecting a plurality of filters to each other, and a domestic water drainage line DL1 in which domestic water (concentrated water) not having passed through the reverse osmosis membrane filter 113 is drained is connected to the reverse osmosis membrane filter 113. Meanwhile, in the present specification and claims, the term 'drained' is defined as being used in the sense of discarding wastewater (drain water, domestic water, and the like) through various drainage lines.

Referring to FIG. 2, raw water supplied to a filter unit 110 through a raw water supply passage L0 is filtered by the filter unit 110, and purified water filtered by the filter unit 110 may be stored in the water tank unit 120 through a purified water inlet passage L2. In this case, the water tank unit 120 may be configured to include a purified water tank 121 for storing purified water filtered by the filter unit 110 at room temperature, and a cold water tank 125 for cooling and storing purified water. The purified water at room temperature accommodated in the purified water tank 121 is drained through an extraction member 170 formed of a faucet, a cock, or the like, through a purified water outlet flow passage L3, a flow passage connection member F1, and a purified water extraction passage L4 according to opening of a purified water extraction valve V2. In addition, the cold water accommodated in the cold water tank 125 is drained through the extraction member 170 through a cold water extraction passage L5 according to opening of a cold water extraction valve V1. Meanwhile, domestic water (concentrated water) not having passed through the reverse osmosis membrane filter 113 is drained through a domestic water drainage line DL1 and a main drainage line DLM formed by merging various drainage lines.

A flow of water during hot water extraction and a flow of water during drainage of drain water generated in the instantaneous heating device 140 will be described with reference to FIG. 3.

Referring FIG. 3, purified water filtered by the filter unit 110 is directly or indirectly supplied to the instantaneous heating device 140 and heated, and then discharged. That is, as for the purified water supplied to the instantaneous heating device 140, the purified water filtered by the filter unit 110 may be directly supplied, but as illustrated in FIG. 3, the purified water filtered from the filter unit 110 is accommodated in the water tank 121 and can be supplied indirectly.

When a hot water extraction signal is input by a user, the supply pump 130 is driven, the instantaneous heating device 140 is heated, and the hot water extraction valve V3 is opened by the control unit C, and accordingly, the purified water filtered by the filter unit 110 flows into the supply pump 130 through the purified water tank 121, the purified water outlet flow passage L3, and the purified water supply flow passage L6.

Since the instantaneous heating device 140 may generate steam due to overheating, the instantaneous heating device 140 is installed below the extraction member 170 in order to secure safety in using the instantaneous heating device 140. Therefore, in order to extract hot water through the extraction member 170, it is necessary to pressurize water through the supply pump 130 and supply the water to the instantaneous heating device 140.

The purified water pressurized by the supply pump 130 flows into the water inlet 141 of the instantaneous heating device 140 through a flow passage and a hot water unit water inlet flow passage and is heated, and then is discharged through the water outlet 142. When a hot water extraction signal is input, the instantaneous heating device 140 performs a heating operation by the control unit C, and accordingly, the instantaneous heating device 140 is configured to heat the purified water flowing into the water inlet 141 to flow to the water outlet 142 so that hot water is discharged through the water outlet 142.

The hot water discharged through the water outlet 142 may be extracted through the extraction member 170 through a hot water outlet passage L7 and a hot water extraction passage L8.

In this case, for heating control according to a flow rate of purified water flowing into the instantaneous heating device 140, a flow rate sensor FS for measuring the flow rate flowing into the instantaneous heating device 140 may be installed at a front end of the instantaneous heating device 140. The control unit. C performs voltage and/or current control applied to a heater provided in the instantaneous heating device 140 based on a flow rate measured by the flow rate sensor FS and a temperature of purified water on a side of the water inlet 141 measured by a temperature sensor (not illustrated) and/or a temperature of hot water on a side of the water outlet 142.

Meanwhile, when the instantaneous heating device 140 is operated after a hot water extraction signal is input, since a temperature of water, initially discharged from the instantaneous heating device 140 is low, a hot water drainage valve V5 may be opened so that the purified water, initially supplied to the instantaneous heating device 140 may be drained according to a predetermined first drainage condition (e.g., a predetermined flow rate or time). In addition, as a user's hot water extraction stop signal and a user's hot water extraction end signal due to completion of extraction of a predetermined amount of hot water, the hot water drainage valve V5 may be opened so that hot water remaining in the instantaneous heating device 140 may be drained according to a predetermined second drainage condition (for example, a predetermined flow rate or time).

As described above, as indicated by the dotted line 'hot water drainage' in FIG. 3, when the hot water drainage valve 5 is opened, the drain water (wastewater) drained from the instantaneous heating device 140 may be drained through the hot water drainage line DL2 and the domestic water drainage line DL1 and a main drainage line DLM in which the domestic water drainage line DL1 and the hot water drainage line DL2 are joined through a flow passage connection member F4.

Next, a flow of water during ice-making will be described with reference to FIG. 4.

Referring to FIG. 4, the water purifier 100 according to an embodiment of the present invention may include an ice-making unit 150 for generating ice and an ice storage 160 for storing ice.

The ice-making unit 150 generates ice by cooling water supplied using a known cooling system. The ice-making unit 150 may use various well-known methods such as an immersion-type ice making method, a spray-type ice making method, a flowing water-type ice making method, an auger-type ice making method, and the like. In addition, the cooling system for generating ice may be a conventional cooling system including a compressor, a condenser, and an evaporator, but an embodiment thereof is not limited thereto, and a cooling method using a thermoelectric module may be used.

Purified water filtered by the filter unit 110 is directly or indirectly supplied to the ice-making unit. 150, and the ice-making unit 150 generates ice using the purified water filtered by the filter unit 110. That is, as for the purified water supplied to the ice-making unit 150, the purified water filtered by the filter unit 110 may be directly supplied, but as illustrated in FIG. 4, the purified water filtered by the filter unit 110 may be accommodated in the purified water tank 121 and may be supplied indirectly.

When an ice-making start signal is generated due to an insufficient amount of ice accommodated in the ice storage 170, the supply pump 130 is driven and the ice-making water supply valve V4 is opened, and accordingly, the purified water filtered by the filter unit 110 is introduced to the supply pump 130 through the purified water tank 121, the purified water outlet flow passage L3, and the purified water supply flow passage L6.

When the purified water tank 121 is not positioned higher than an ice-making water supply port 151 of the ice-making unit 150, that is, when the purified water tank 121 and the ice-making water supply port. 151 are located in substantially horizontal direction, ice-making water (purified water) is not supplied only by opening the ice-water supply valve V4. Accordingly, in order to supply the ice-making water to the ice-making water supply port 151, the supply pump 130 is driven to pressurize water and supply the water to the ice-making unit 150.

The purified water pressurized by the supply pump 130 flows into the ice-making water inlet 151 through the flow passage connection member F2, the ice-making unit water flow passage L6a and is supplied to the ice-making unit 150.

The ice generated by the ice-making unit 150 may be accommodated in the ice storage 160 through an ice removal process. In order to remove the ice, a method of supplying a hot gas, which is a high-temperature refrigerant, to an evaporator may be used, but a method of heating the evaporator through a heater may also be used.

The ice storage 160 is located below the ice-making unit 150 to accommodate the ice removed, and the ice stored in the ice storage 160 may be provided to a user through the ice outlet 165.

Next, the priority of a domestic water drainage process (② in FIG. 5) and a hot water drainage process (① in FIG. 5) by the control unit C will be described with reference to FIGS. 2, 3 and 5.

The control unit C may be configured to control flow passages of the opening and closing a hot water drainage line DL2 and a domestic water drainage line DL1 so that a hot water drainage process (①) is preferentially performed than a domestic water drainage process ②), among, as the hot water drainage process (① in FIG. 5) in which drain water of the instantaneous heating device 140 is drained through the hot water drainage line DL2, when a hot water is extracted, as illustrated in FIG. 3, a domestic water drainage process (② in FIG. 5) in which domestic water that is not filtered by the reverse osmosis membrane filter 113 is drained through the domestic water drainage line DL1, in a process of generating purified water by filtering raw water, as illustrated in FIG. 2.

Specifically, when a hot water drainage signal for draining the drain water drained from the instantaneous heating device 140 through the hot water drainage line DL2 is input, the control unit C may be configured to open the hot water drainage valve V5 so that the hot water drainage process (①) is performed, and close the supply valve FV so that water does not flow into the reverse osmosis membrane filter 113 so that the domestic water drainage process (②) is not performed, so that the hot water drainage process (①) is preferentially performed.

In addition, when a hot water drainage signal while a domestic water drainage process (②) in which domestic water, not filtered by the reverse osmosis membrane filter 113 is drained through the domestic water drainage line DL1 while the supply valve (FV) is opened to generate purified water is performed, the control unit C may be configured to open the hot water drainage valve V5 in order to preferentially perform the hot water drainage process (①), close the supply valve FV so that the hot water drainage process (①) is preferentially performed than the domestic water drainage process (②) and reopen the supply valve FV after the hot water drainage process (①) is terminated, so that the domestic water drainage process (②) is performed. That is, when the hot water drainage process (①) and the domestic water drainage process (②) are simultaneously performed, the control unit C is configured to control opening and closing of a flow path so that the domestic water drainage process (②) is performed after the hot water drainage process (①) is performed.

When a hot water drainage signal is input in a state in which a supply valve is closed and purified water is not generated, the control unit C may be configured to open a hot water drainage valve V5 so that a hot water drainage process is performed, and a closed state of the supply valve FV is maintained.

In addition, when a hot water drainage signal is input, the control unit C may be configured to drive the supply pump 130 so that purified water is supplied to the water inlet 141 of the instantaneous heating device 140.

In this case, the hot water drainage signal may include at least one of an initial drainage signal for draining the purified water, initially supplied to the instantaneous heating device 140 through the hot water drainage line DL2 according to a predetermined first drain condition as a hot water extraction signal is input by a user; and a terminal drainage signal for draining the hot water, remaining in the instantaneous heating device 140 as a hot water extraction end signal is input due to the user's interruption of hot water extraction or completion of the extraction of a predetermined amount of hot water through the hot water drainage line DL2 according to a predetermined second drain condition. Here, the first drain condition and the second drain condition may be set to a predetermined flow rate or a predetermined time, and both values may be the same or different.

Meanwhile, in FIGS. 2 and 5, a case of closing the supply valve FV is exemplified to prevent the domestic water drainage process (②) from being performed, but the interruption of the domestic water drainage process (②) may also be performed by installing a separate domestic water drainage valve (not illustrated) and closing the domestic water drainage valve.

As described above, according to a first embodiment of the present disclosure, by preferentially performing the hot water drainage process (①) in which the drain water of the instantaneous heating device 140 when hot water is extracted is drained through the hot water drainage line DL2 than the domestic water drainage process (②) for draining domestic water, not filtered by the reverse osmosis membrane filter 113 in a process of generating purified water by filtering raw water, it is possible to prevent the hot water drainage process (①) and the domestic water drainage process (②) from being performed simultaneously, and thereby, it is possible to smoothly and stably drain the drain water of the instantaneous heating device 140.

When a hot water extraction signal is input by a user and the instantaneous heating device 140 operates, it is possible to prevent hot water from being drained in a process in which the drain water (wastewater) is discharged from the instantaneous heating device 140 according to predetermined condition (e.g., predetermined flow rate), and heating of the water accommodated in the instantaneous heating device 140 is continued in a state in which hot water is not extracted, so that it can prevent a serious accident such as explosion of the instantaneous heating device 140 from occurring.

Next, a water purifier 100 according second embodiment of the present disclosure will be described with reference to FIGS. 6 to 11.

Figure 6:
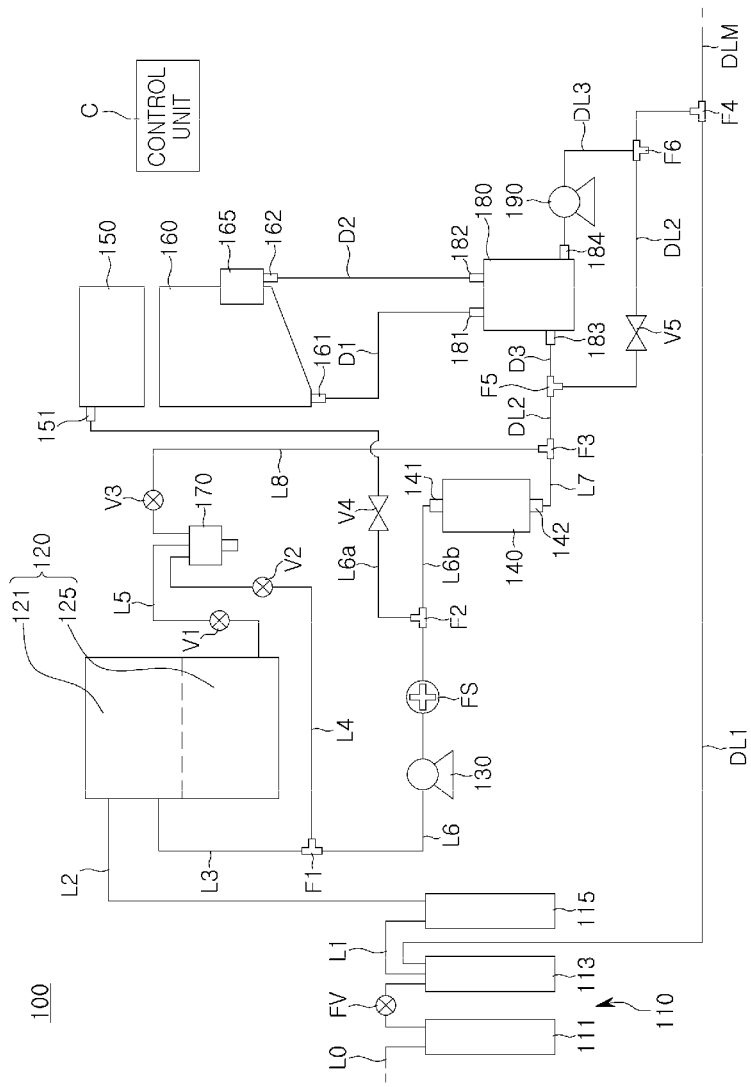
FIG. 6 is a schematic water pipe diagram of a water purifier according to a second embodiment of the present invention.
Figure 7:
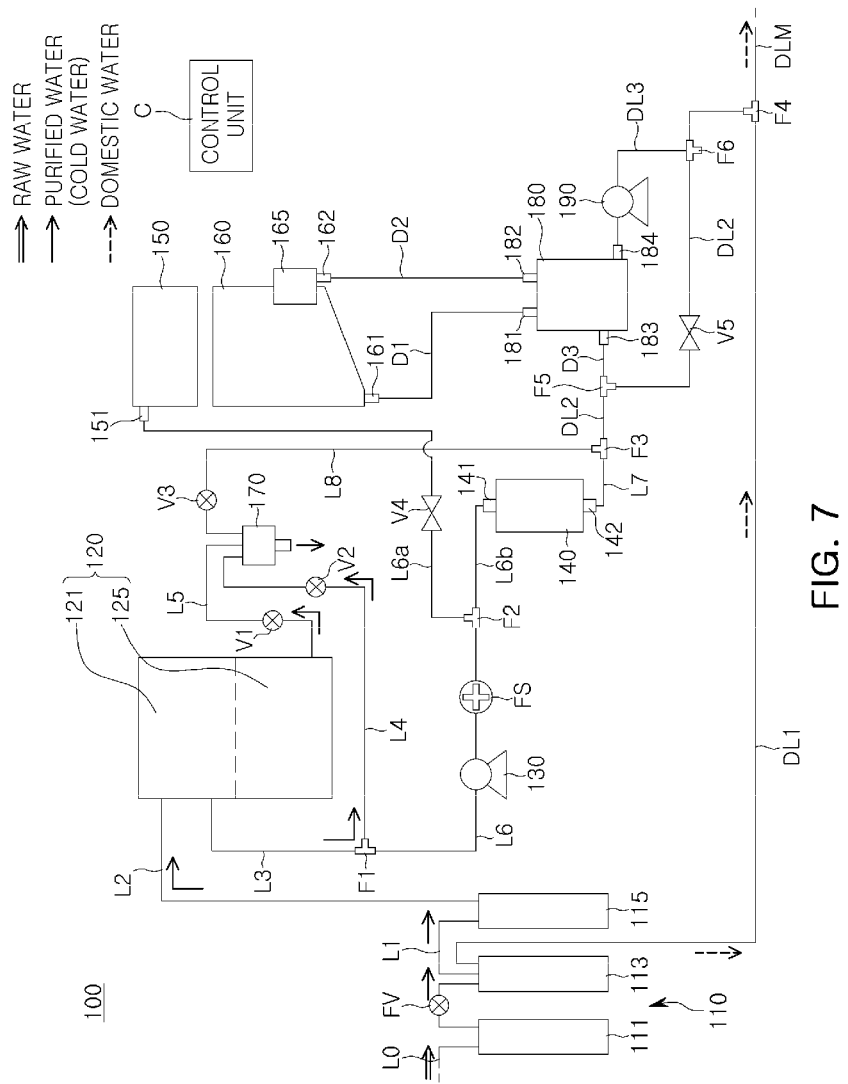
FIG. 7 is a water pipe diagram illustrating a flow of water when filtration of raw water and extraction of purified/cold water are performed in the water purifier illustrated in FIG. 6.
Figure 8:
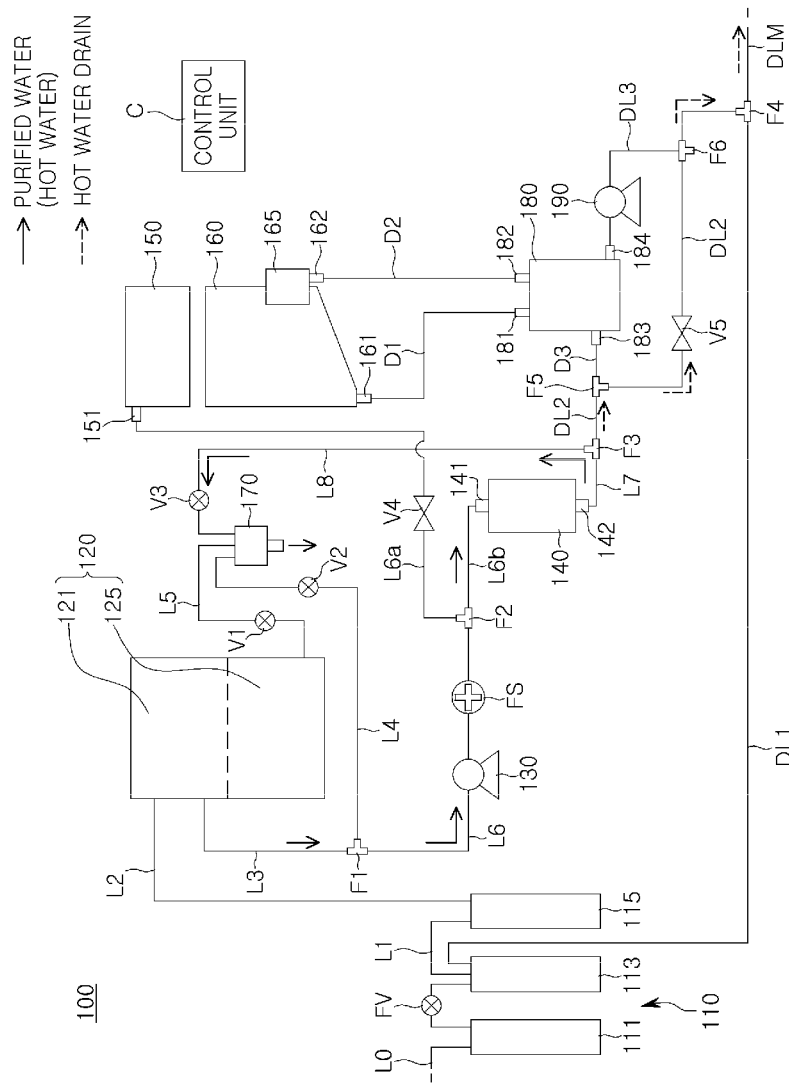
FIG. 8 is a water pipe diagram illustrating a flow of water when extraction of hot water is performed from the water purifier illustrated in FIG. 6.
Figure 9:
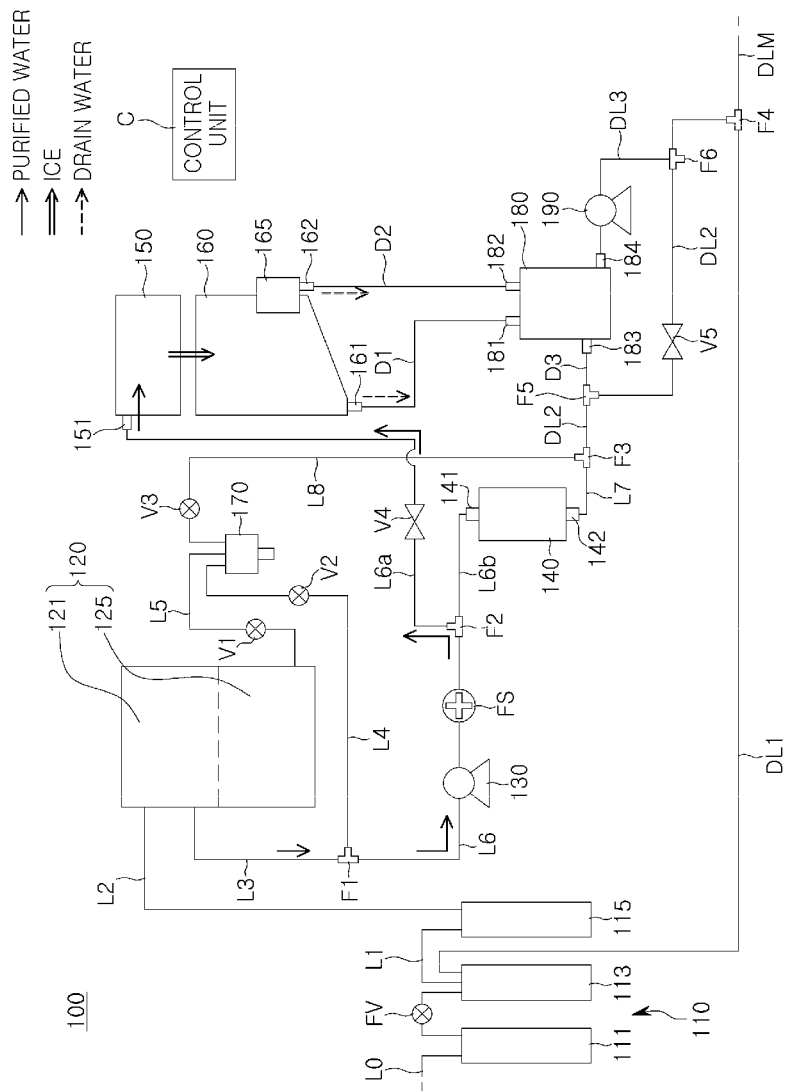
FIG. 9 is a water pipe diagram illustrating a flow of water when ice is made in the water purifier illustrated in FIG. 6.
Figure 10:
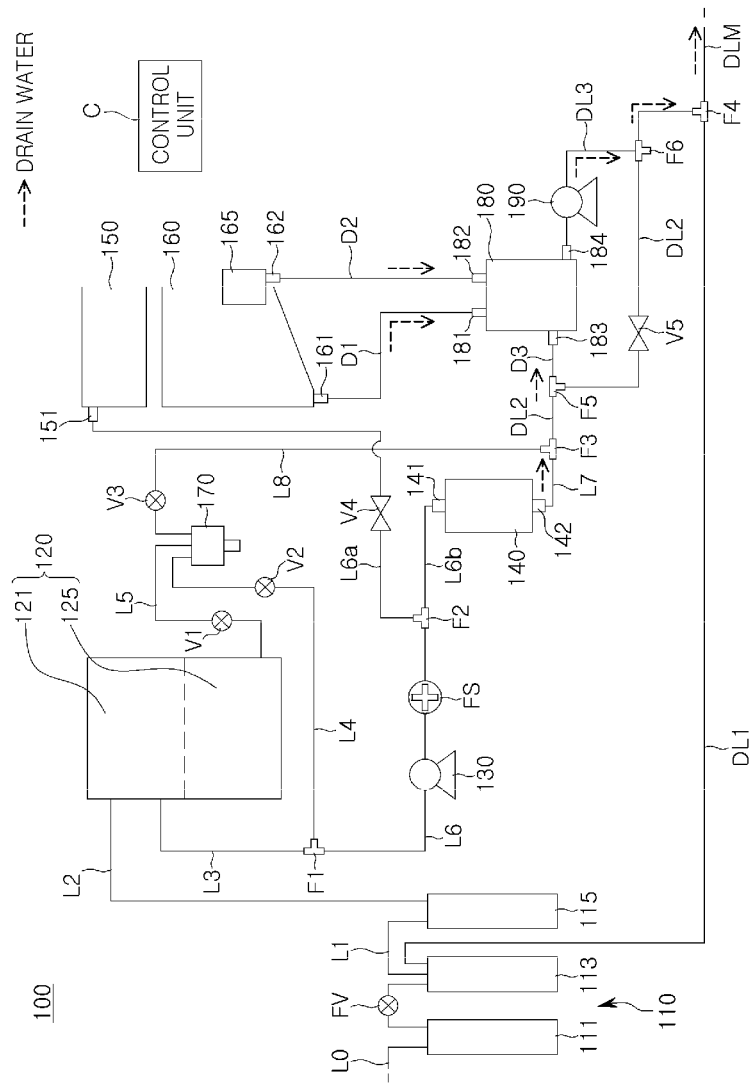
FIG. 10 is a water pipe diagram illustrating a flow of drain water flowing into a drainage tank and a flow of drain water draining from the drainage tank in the water purifier illustrated in FIG. 6.
Figure 11:
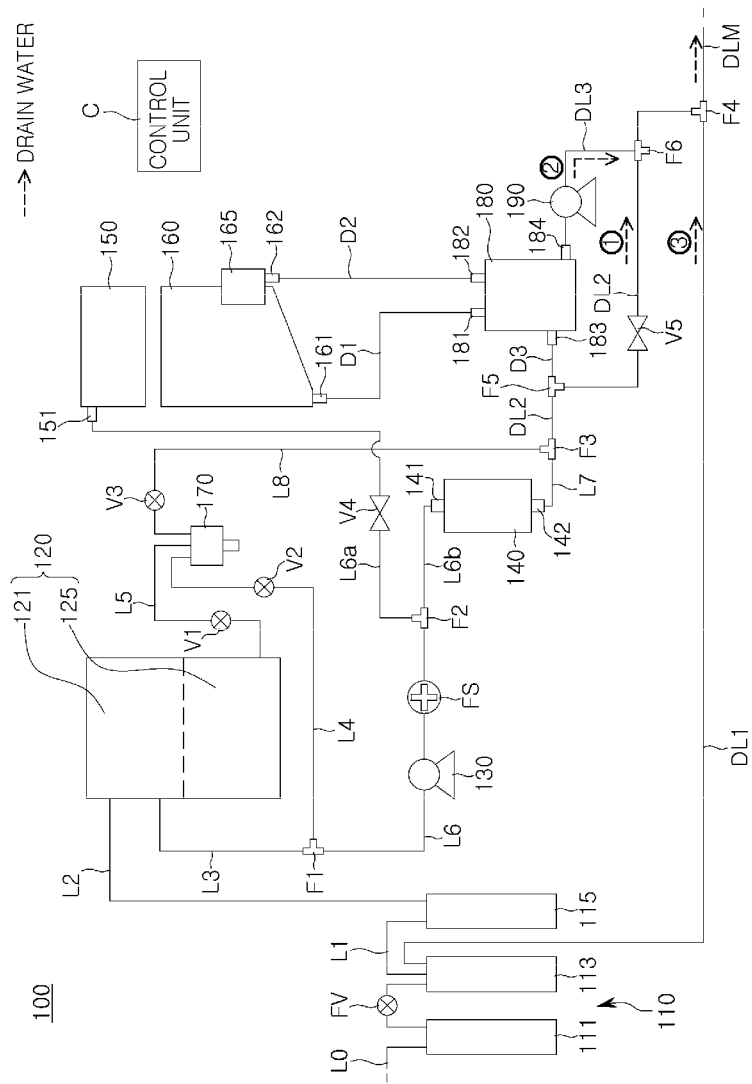
FIG. 11 is a water pipe diagram illustrating priority of a domestic water drainage process, a hot water drainage process, and a drainage tank drainage process in the water purifier illustrated in FIG. 6.

FIG. 6 is a schematic water pipe diagram of the water purifier 100 according to a second embodiment of the present disclosure, FIG. 7 is a schematic water pipe diagram of a flow of water when filtration of raw water and extraction of purified water/cold water are performed by the water purifier 100 illustrated in FIG. 6, FIG. 8 is a schematic water pipe diagram illustrating a flow of water when extraction of hot water is performed by the water purifier 100 illustrated in FIG. 6, and FIG. 9 is a schematic water pipe diagram of a flow of water when ice-making is performed by the water purifier 100 illustrated in FIG. 6, and FIG. 10 is a water pipe diagram illustrating a flow of drain water flowing into the drainage tank 180 and drain water drained from the drainage tank 180 in the water purifier 100 according to a second embodiment of the present disclosure, and FIG. 11 is a water pipe diagram illustrating the domestic water drainage process being performed first (③ in FIG. 11), the hot water drainage process (① in FIG. 11), and the drainage tank drainage process (② in FIG. 11).

Compared to the water purifier 100 according to a first embodiment illustrated in FIGS. 1 to 5, there is a difference only in that the water purifier 100 according to a second embodiment illustrated in FIGS. 6 to 11 further includes a drainage tank 180 for storing drain water generated inside the water purifier 100, a drainage tank drainage line DL3 from which the drain water accommodated in the drainage tank 180 is drained, a drainage pump 190 provided in the drainage tank drainage line DL3 and operating to drain the drain water accommodated in the drainage tank 180. Accordingly, in order to avoid unnecessary duplication, detailed descriptions of the same or similar components as those of the water purifier 100 according to a first embodiment illustrated in FIGS. 1 to 5.

First, since a flow of water when filtration of raw water and extraction of purified water/cold water illustrated in FIG. 7 are performed, is the same as the flow of water described based on FIG. 2, a detailed description thereof will be omitted.

In addition, since a flow of water when extraction of hot water is performed illustrated in FIG. 8 is the same as the flow of water described based on FIG. 3, a detailed description thereof will be omitted.

Next, since a flow of water when ice making illustrated in FIG. 9 is performed as illustrated in FIG. 9 is the same as the flow of water in the case of ice making described with reference to FIG. 4, a detailed description thereof will be omitted. However, there is a difference in that the drainage tank 180 may be additionally provided in the case of FIG. 8 so that drain water from an ice storage can be supplied to the drainage tank 180.

A thawed water drainage port 161 through which water (thaw water) from melted ice accommodated in the ice storage 160 is discharged may be provided below the ice storage 160. The thawed water drainage port 161 may be connected to a thawed water inlet 181 of the drainage tank 180 through a thawed water drainage line D1, and melted ice water (drain water) discharged through the thawed water drain 161 may be stored in the drainage tank 180.

In addition, the ice storage 160 may be provided with an ice outlet 165 through which ice is discharged externally, and may be provided with a drainage port 162 on a side of the outlet functioning such that water formed around the ice outlet 165 in a position adjacent to the ice outlet 165 is drained externally. The drainage port 162 on the side of the ice outlet 165 may function to drain the various drain water (wastewater), formed around the ice outlet 165 such as water generated by dew condensation due to a temperature difference between an inside and outside of the ice outlet 165 or water from which ice cubes, or the like, existing around the ice outlet 165 are melted, externally. The drainage port 162 on the side of the ice outlet may be formed on a lower side of the ice storage 160 adjacent to the ice outlet 165 as illustrated in FIGS. 6 and 9. In addition, the drainage port 162 on the side of the ice outlet 162 may be connected to an inlet on a side of the ice outlet 182 of the water tank 180, and the drain water drained from the drainage port on the side of the ice outlet 162 may be stored in the drainage tank 180.

Referring to FIG. 10, a flow of drain water flowing into the drainage tank 180 and a flow of drain water draining from the drainage tank 180 will be described. As described with reference to FIG. 9, the drainage tank 180 may accommodate the drain water drained from the thawed water drainage port 161 and/or the drainage port 162 on the side of water outlet of the ice storage 160.

In addition, the drainage tank 180 can also accommodate the drain water drained from the instantaneous heating device 140. Specifically, when the instantaneous heating device 140 is operated after a hot water extraction signal is input, since a temperature of water, initially discharged from the instantaneous heating device 140 is low, the purified water, initially supplied to the instantaneous heating device 140 may be supplied to the drainage tank 180 according to a predetermined first drainage condition (e.g., a predetermined flow rate or time), In this case, as illustrated in FIG. 10, drain water drained from the instantaneous heating device 140 to the hot water outlet passage L7 may be introduced to the drainage tank 180 through a flow passage connection member F3, a portion of the hot water tank drainage line DL2, a flow passage connection member F5, and a hot water drainage line D3.

Meanwhile, when a user's hot water extraction stop signal or a user's hot water extraction end signal due to completion of extraction of a predetermined amount of hot water is input, hot water remaining in the instantaneous heating device 140 may be drained according to a predetermined second condition (for example, a predetermined flow rate or time), and in this case, since a temperature of the water drained from the instantaneous heating device 140 is high, the drainage tank 180 may be damaged, so it is preferable to drain the water directly through the hot-water drainage line DL2 rather than storing the same in the drainage tank 180.

The drainage tank 180 is provided with a water level sensor (not illustrated) for detecting a water level therein. When the water level of the drainage tank 180 corresponds to a predetermined water level (e.g., full water level), a drainage tank drainage signal for draining drain water accommodated in the drainage tank 180 through the drainage tank drainage line DL3 may be generated, and when a drainage tank drainage signal is input, the control unit performs a drainage tank drainage process (②) in FIG. 11). This drainage tank drainage process (②) may be performed until the water level of the drainage tank 180 corresponds to a predetermined water level (e.g., low water level). In order to perform the drainage tank drainage process (②), the control unit C operates a drainage pump 190 connected to the drain outlet 184 of the drainage tank 180. When the drainage tank drainage process (②) is performed, the drain water accommodated in the drainage tank 180 may be drained through a main drainage line DLM passing through the drain outlet 184, the drainage pump 190, the drainage tank drainage line DL3, and the flow passage connection members F6 and F4.

Finally, with reference to FIG. 11, a priority of the domestic water drainage process (③ in FIG. 11), the hot water drainage process (① in FIG. 1), and the drainage tank drainage process (② in FIG. 11) will be described.

As illustrated in FIG. 8, the control unit C is configured to control opening and closing of the flow passages of the hot water drainage line DL2, the domestic water drainage line DL1, and the drainage tank drainage line D13 are controlled so that a drain operation is preferentially performed in an order of the hot water drainage process (①), the drainage tank drainage process (②), and the domestic water drainage process (③), among the hot water drainage process (① in FIG. 11) in which, when a hot water is extracted, drain water of the instantaneous heating device 140 is drained through the hot water drainage line DLS as illustrated in FIG. 8, the domestic water drainage process (③ in FIG. 11) in which, in a process of generating purified water by filtering raw water, domestic water not filtered by the reverse osmosis membrane filter 113 through the domestic water drainage line DL1 is drained through the domestic water drainage line DLS as illustrated in FIG. 7, and the drainage tank drainage process (② in FIG. 11) in which drain water contained (accommodated?) in the drainage tank 180 is drained through the drainage tank drainage line DL3 as illustrated in FIG. 10.

That is, when two or more drainage processes among the hot water drainage process (①), the drainage tank drainage process (②), and the domestic water drainage process (③) are performed at the same time, the control unit C is configured to allow the hot water drainage process (①) be preferentially performed, allow the drainage tank drainage process (②) in a state in which the hot water drainage process (①) is not performed, and allow the domestic water drainage process (③) in a state in which the hot water drainage process (①) and the domestic tank drainage process (②) are not performed.

Specifically, when a hot water drainage signal for draining the drain water drained from the instantaneous heating device 140 through the hot water drainage line DL2 is input, the control unit C may be configured to open a hot water drainage valve V5 to prevent a drainage pump 190 from operating and close a supply valve FV to perform the hot-water drainage process (①) with the highest priority.

When a drainage tank drainage signal for draining the drain water accommodated in the drainage tank 180 through a drainage tank drainage line DL3 is input, if the hot water drainage process (①) is being performed, after the hot-drainage process (①) is finished, the control unit C may be configured to drive the drainage pump 190 to perform the drainage tank drainage process (②), and when the hot water drainage process (①) is not being performed, the control unit C may be configured to drive the drainage pump 190 and close the supply valve FV so that the drainage tank drainage process (②) is performed.

When a hot water drainage signal is input in a state in which a supply valve FV is opened, the control unit C may be configured to open the hot water drainage valve V5 and close the supply valve FV so that the hot water drainage process (①) is performed, to reopen the supply valve, after the hot water drainage process (①) is finished, so that the domestic water drainage process (③) is performed.

In addition, when a drainage tank drainage signal is input in a state in which the supply valve FV is opened, the control unit C may be configured to drive the drainage pump 190 and close the supply valve FV so that the drainage tank drainage process (②) is performed, and reopen the supply valve FV, after the drainage tank drainage process (②) is terminated, so that the domestic water drainage process (③) is performed.

When a hot water drainage signal is input in a state in which the supply valve FV is closed, the control unit C may be configured to open the hot water drainage valve V5 so that the hot water drainage process (①) is performed and a closed state of the supply valve FV is maintained.

In addition, when a drainage tank drainage signal is input in a state in which the supply valve V is closed, the control unit C may be configured to drive the drainage pump 190 and maintain the closed state of the supply valve FV so that the drainage tank drainage process (②) is performed.

In addition, when a hot water drainage signal is input, the control unit C may be configured to drive the supply pump 130 to supply purified water to the water inlet 141 of the instantaneous heating device 140.

In this case, the hot water drainage signal may include a terminal drainage signal for draining hot water remaining in the instantaneous heating device 140 as a hot water extraction end signal is input, through a hot water drainage line DL2 according to a predetermined second drain condition. Here, the second drain condition may be set to a predetermined flow rate or a predetermined time.

Meanwhile, in FIGS. 7 and 11, a case in which the supply valve FV is closed in order to prevent the domestic water drainage process (③) from being performed is exemplified, but interruption of the domestic water drainage process (③) may be performed by installing a separate domestic water drainage valve (not illustrated) in the domestic water drainage line DL1 and closing the separate domestic water drainage valve.

As described above, according to a second embodiment of the present disclosure, by performing with priority a drain operation in an order of the hot water drainage process (①), the drainage tank drainage process (②), and the domestic water drainage process (③), among the hot water drainage process (①), the domestic water drainage process when purified water is generated (③), and the drainage tank drainage process (②) that occurs when water is full in the drainage tank 180, it is possible to prevent two or more drainage processes from being performed at the same time among the hot water drainage process (①), the drainage tank drainage process (②), and the domestic water drainage process (③).

In addition, when two or more drainage processes are simultaneously performed, the drainage process according to the priority is performed first and the remaining processes are sequentially performed, so that the drain water of the instantaneous heating device 140 may be smoothly and stably drained. Therefore, when the hot water extraction signal is input by the user and the instantaneous heating device 140 is operated, it may prevent the hot water from being drained while drain water (wastewater) discharged from the instantaneous heating device 140 is drained according to a predetermined condition (e.g., predetermined flow rate), and heating of the water accommodated in the instantaneous heating device 140 in a state in which hot water is not extracted so that the instantaneous heating device 140 is overheated, so that it may prevent a serious accident such as an explosion of the instantaneous heating device 140 from occurring. In addition, by controlling drainage of the drain water accommodated in the drainage tank 180 so that the drain has priority over the drain of domestic water, it may prevent safety accidents such as overflow of water and electric shock or fire due thereto that may occur due to drain failure of the drain water drained from the drainage tank 180.

While example embodiments have been shown and described above, it will be apparent to those skilled in the art that modifications and variations could be made without departing from the scope of the present disclosure as defined by the appended claims.

In addition, in the embodiment of the present disclosure, some components may be implemented in a deleted state, and the configuration of each embodiment may be configured in combination with each other.

DESCRIPTION OF REFERENCE NUMERALS

100 . . . Water Purifier, 110 . . . Filter Unit,
111 . . . Pre-Filter, 113 . . . Reverse Osmosis Membrane Filter,
115 . . . Post Filter, 120 . . . Water Tank Unit,
121 . . . Purified Water Tank. 125 . . . Cold Water Tank,
130 . . . Supply Pump, 140 . . . Instantaneous Heating Device,
141 . . . Water Inlet, 142 . . . Water Outlet,
150 . . . Ice-Making Unit, 151 . . . Ice-Making Water Supply Port,
160 . . . Ice Storage, 161 . . . Thawed Water Drainage port,
162 . . . Drainage port On Side Of Water Outlet, 165 . . . Ice outlet,
170 . . . Extraction Member, 180 . . . Drainage tank,
181 . . . Thawed Water Inlet, 182 . . . Inflow Port On Side Of Water Outlet,
183 . . . Hot water Drain Inflow Inlet, 182 . . . Drain water Outlet,
190 . . . Drainage pump, C . . . Control Unit,
D1 . . . Thawed Water Drainage line, D2 . . . Drainage line On Side Of Outlet,
D3 . . . Hot water Drainage line, DL1 . . . Domestic Water Drainage line,
DL2 . . . Hot water Drainage line, DL3 . . . Drainage tank Drainage line,
DLM . . . Main Drainage line, F1, F2, F3, F4 . . . Passage Connection Member,
FS . . . Flow Rate Sensor, FV . . . Supply Valve
L0 . . . Raw Water Supply Passage, L1 . . . Filter Unit Passage,
L2 . . . Purified Water Inlet Passage, L3 . . . Purified Water Outlet Passage,
L4 . . . Purified Water Extraction Passage, L5 . . . Cold Water Extraction Passage
L6 . . . Purified Water Supply Passage, L6*a* . . . Ice-Making Unit Inlet Passage,
L6*b* . . . Hot Water Inlet Passage, L7 . . . Hot Water Outlet Passage,
L8 . . . Hot Water Extraction Passage, V1 . . . Cold Water Extraction Valve,
V2 . . . Purified Water Extraction Valve, V3 . . . Hot Water Extraction Valve,
V4 . . . Ice-Making Water Supply Valve, V5 . . . Hot water drainage Valve

The invention claimed is:

1. A water purifier, comprising:
a filter unit having a reverse osmosis membrane filter in order to generate purified water;
a supply valve opened and closed so that water is supplied to the reverse osmosis membrane filter;
an instantaneous heating device having a water inlet supplied with purified water, having been filtered by the filter unit, and a water outlet having the purified water heated and discharged therefrom, and heating the purified water flowing into the water inlet and flowing out to the water outlet, so that hot water is discharged through the water outlet;
an extraction member provided for extracting the hot water discharged from the instantaneous heating device;
a supply pump operating in order to supply purified water to the water inlet of the instantaneous heating device;
a domestic water drainage line from which domestic water, having not been filtered by the reverse osmosis membrane filter is discharged;
a hot water drainage line from which drain water, having been drained from the instantaneous heating device is drained;
a hot water drainage valve provided in the hot water drainage line so as to open and close the hot water drainage line; and
a control unit controlling the valves and opening and closing of respective flow passages of the hot water drainage line and the domestic water drainage line so that, among a hot water drainage process through the hot water drainage line, and a domestic water drainage process through the domestic water drainage line, the hot water drainage process is carried out first.

2. The water purifier of claim 1, wherein, when a hot water drainage signal for draining drain water drained from the instantaneous heating device through the hot water drainage line is input, the control unit is configured to open the hot water drainage valve and close the supply valve so that the hot water drainage process is performed.

3. The water purifier of claim 2, wherein, when the hot water drainage signal is input in a state in which the supply valve is opened, the control unit is configured to open the hot water drainage valve and close the supply valve so that the hot water drainage process is performed, and to reopen the supply valve, after the hot water drainage process is terminated, so that the domestic water drainage process is performed, and when a hot water drainage signal is input in a state in which the supply valve is closed, the control unit is configured to open the hot water drainage valve so that the hot water drainage process is performed, and the supply valve is maintained to be in a closed state.

4. The water purifier of claim 2, wherein, when a hot water drainage signal is input, the control unit configured to drive the supply pump to supply purified water to the water inlet.

5. The water purifier of claim 4, wherein the hot water drainage signal comprises at least one of
an initial drainage signal of draining purified water, initially supplied to the instantaneous heating device as a hot water extraction signal is input through the hot water drainage line according to a predetermined first drain condition, and a terminal drainage signal of draining hot water remaining in the instantaneous heating device as a hot water extraction end signal is input through the hot water drainage line according to a predetermined second drain condition.

6. The water purifier of claim 1, further comprising:

a drainage tank for storing drain water generated inside the water purifier;

a drainage tank drainage line through which drain water accommodated in the drainage tank is drained; and a drainage pump provided in the drainage tank drainage line and operated to drain the drain water accommodated in the drainage tank, wherein the control unit is configured to control opening and closing of flow passages of the hot water drainage line, the domestic water drainage line, and the drainage tank drainage line so that a drain operation is preferentially performed in an order of the hot water drainage process, the drainage tank drainage process, and the domestic water drainage process, among the hot water drainage process, the domestic water drainage process, and the drainage tank drainage process through the drainage tank drainage line.

7. The water purifier of claim 6, wherein, when a hot water drainage signal for draining the drain water drained from the instantaneous heating device through the hot water drainage line is input, the control unit is configured to open the hot water drainage valve so that the drainage pump is not operated and close the supply valve so that the hot water drainage process is performed, and when a drainage tank drainage signal for draining the drain water accommodated in the drainage tank through the drainage tank drainage line is input, when the hot water drainage process is being performed, the control unit is configured to drive the drainage pump, after the hot water drainage process is terminated, so that the drainage tank drainage process is performed, and when the hot water drainage process is not being performed, the control unit is configured to drive the drainage pump and close the supply valve so that the drainage tank drainage process is performed.

8. The water purifier of claim 7, wherein, when the hot water drainage signal is input in a state in which the supply valve is opened, the control unit is configured to open the hot water drainage valve and close the supply valve so that the hot water drainage process is performed, and reopen the supply valve, after the hot water drainage process is terminated, so that the domestic water drainage process is performed, when the drainage tank drainage signal is input in a state in which the supply valve is opened, the control unit is configured to drive the drainage pump and close the supply valve so that the drainage tank drainage process is performed, and reopen the supply valve, after the drainage tank drainage process is terminated, so that the domestic water drainage process is performed, when the hot water drainage signal is input in a state in which the supply valve is closed, the control unit is configured to open the hot water drainage valve so that the hot water drainage process is performed and a closed-state of the supply valve is maintained, and when the drainage tank drainage signal is input in a state in which the supply pump is closed, the control unit is configured to drive the drainage pump and maintain a closed state of the supply valve so that the drainage tank drainage process is performed.

9. The water purifier of claim 6, wherein the drainage tank stores drain water, initially drained from the instantaneous heating device after a hot water extraction signal is input.

10. The water purifier of claim 6, further comprising:

an ice-making unit for generating ice through the purified water filtered by the filter unit; and an ice storage for storing the ice generated by the ice-making unit, wherein the drainage tank stores the drain water drained from the ice storage.

\* \* \* \* \*